United States Patent [19]
Hergenrother et al.

[11] Patent Number: 5,962,593
[45] Date of Patent: Oct. 5, 1999

[54] POLY (METAL CARBOXYLATE) GRAFTED RUBBERS WITH HIGH MODULUS

[75] Inventors: William L. Hergenrother, Akron; Frederick J. Ravagnani, Uniontown; John M. Doshak, Mogadore, all of Ohio

[73] Assignee: Bridgestone Corporation, Tokyo, Japan

[21] Appl. No.: 08/333,120

[22] Filed: Nov. 1, 1994

Related U.S. Application Data

[63] Continuation of application No. 07/999,516, Dec. 30, 1992, abandoned.

[51] Int. Cl.$^6$ .............................. C08F 8/42; C08L 9/00; C08L 11/00
[52] U.S. Cl. .............................. 525/274; 525/78; 525/80; 525/298; 525/302; 525/308; 525/331.9; 525/333.3; 525/333.1; 525/370
[58] Field of Search .................................... 525/274, 275, 525/78, 71, 80, 302, 298, 308, 370; 524/495, 504, 533, 523

[56] References Cited

U.S. PATENT DOCUMENTS

| | | | |
|---|---|---|---|
| 4,076,255 | 2/1978 | Moore et al. | 273/226 |
| 4,284,541 | 8/1981 | Takeda et al. | 260/27 |
| 4,495,326 | 1/1985 | Donatelli et al. | 524/533 |
| 4,500,466 | 2/1985 | Hayes et al. | 260/429.9 |
| 4,713,409 | 12/1987 | Hayes et al. | 524/518 |
| 4,906,687 | 3/1990 | Modic | 525/57 |
| 4,908,401 | 3/1990 | Ohara et al. | 524/495 |
| 4,929,684 | 5/1990 | Roland et al. | 525/274 |
| 5,126,501 | 6/1992 | Ellul | 524/394 |
| 5,217,807 | 6/1993 | Steiber et al. | 428/378 |

FOREIGN PATENT DOCUMENTS 2170848  7/1990  Japan .

*Primary Examiner*—Fred Zitomer
*Attorney, Agent, or Firm*—Frank J. Troy, Sr.

[57] ABSTRACT

A graft copolymer rubber comprising an unsaturated hydrocarbon rubber backbone having pendently grafted thereto a polymerized metal salt of an unsaturated carboxylic acid is provided. The graft copolymer rubber is prepared by a method which involves dissolving an unsaturated hydrocarbon rubber in a solvent to form a rubber solution, adding a metal salt of an unsaturated carboxylic acid to the solution, adding a free radical initiator to the solution and then heating the resultant reaction mixture at a temperature of from about 40 to about 150° C. for a time period of from about 0.1 to about 100 hours.

The resultant graft copolymer rubber is sulfur curable and when compounded with conventional rubber additives and cured forms rubber compounds having high modulus. The graft copolymer rubbers of the invention can be used in various end use applications where high strength properties are important such as tires, industrial rubber goods and the like.

16 Claims, No Drawings

POLY (METAL CARBOXYLATE) GRAFTED RUBBERS WITH HIGH MODULUS

This is a continuation of application Ser. No. 07/999,516 filed on Dec. 30, 1992, now abandoned.

BACKGROUND OF THE INVENTION

The present invention relates to poly (metal carboxylate) grafted rubbers having high modulus properties in the cured state. More particularly, the invention relates to a graft copolymer rubber comprising an unsaturated hydrocarbon rubber backbone having pendently grafted thereto a polymerized metal salt of an unsaturated carboxylic acid and to a method for preparing the graft copolymer rubber.

Rubber compounds having high modulus properties in the cured state are known in the art. Such rubber compounds have previously been prepared by mixing rubbers such as natural rubber, diene rubber, styrene/butadiene rubber, EPDM rubber and the like with a metal salt of an unsaturated carboxylic acid such as zinc dimethacrylate and an organic peroxide curing agent. Rubber compounds of this type are illustrated by U.S. Pat. Nos. 4,500,466 to Hayes et al; 4,529,770 to Hayes et al and 4,720,526 to Roland.

Rubber compounds of the type described in the above patents provide significant advantages in physical properties particularly increased strength in the cured state. However, such rubber compounds suffer from significant disadvantages due to the use of the metal salt as a separately added pigment and the use of peroxide curing agents. Thus, the mixing of such rubber compounds is often accompanied by undesirable odor problems, cure contamination, sensitivity of peroxides to heat and sticking of the metal salt to the mixing equipment.

Accordingly, the development of rubbers and rubber compounds which do not suffer from such disadvantages is a highly desirable objective. The present invention overcomes these disadvantages.

SUMMARY OF THE INVENTION

In accordance with the present invention, sulfur curable poly (metal carboxylate) grafted copolymer rubbers which can be utilized to form rubber compounds having high modulus properties in the cured state are provided. The poly (metal carboxylate) graft copolymer rubbers comprise an unsaturated hydrocarbon rubber backbone having pendently grafted thereto a polymerized metal salt of an unsaturated carboxylic acid. These graft copolymer rubbers are prepared by a method which comprises the steps of:

(a) dissolving an unsaturated hydrocarbon rubber in a solvent to form a rubber solution;

(b) adding a metal salt of an unsaturated carboxylic acid to the rubber solution;

(c) adding a free radial initiator to the rubber solution and;

(d) heating the resultant reaction mixture at a temperature of from about 40 to about 150° C. for a time period of from about 0.1 to about 100 hours.

DETAILED DESCRIPTION OF THE INVENTION

Various unsaturated hydrocarbon rubbers may be utilized to form the polymeric backbone of the graft copolymer rubber. The preferred unsaturated hydrocarbon rubbers include diene polymers or copolymers and EPDM terpolymers.

Diene polymers or copolymers which may comprise the backbone of the graft copolymer include homopolymers of conjugated dienes and copolymers of conjugated dienes and vinyl aromatic hydrocarbons. Suitable diene monomers which can be used to form the homopolymers or copolymers include 1,3-butadiene, isoprene, 1,3-pentadiene, 2,3-dimethyl-1,3-butadiene, 1,3-hexadiene and the like. The preferred diene monomers are 1,3-butadiene and isoprene. Suitable vinyl aromatic hydrocarbon monomers which can be used to form the copolymers include styrene, alpha-methylstyrene, p-methylstyrene, vinyltoluene, vinylnaphthalene and the like. The preferred vinyl aromatic hydrocarbon monomer is styrene.

The diene copolymers may have diene contents of from about 95 to about 50 percent by weight and vinyl aromatic hydrocarbon contents of from about 5 to about 50 percent by weight with the preferred copolymers having diene contents of from 95 to 65 percent by weight and vinyl aromatic hydrocarbon contents of from 5 to 35 percent by weight.

Diene polymers or copolymers which may be employed include both emulsion and solution prepared diene polymers or copolymers such as polybutadiene, polyisoprene, styrene/butadiene rubber (SBR) and the like. A number of polymers and rubbers of these types are commercially available and a commercially available rubber can be utilized if desired. Alternatively, the diene polymers or copolymers can be separately prepared prior to the preparation of the graft copolymer. The preferred diene polymers or copolymers are the solution polymers.

The diene polymers or copolymers can be prepared in solution in well known manner by polymerizing the monomer or monomers in a hydrocarbon solvent in the presence of an anionic initiator. In instances where it is desired to control the vinyl or 1,2-microstructure of the diene polymer or copolymer and to effect randomization of the copolymer, this can readily be accomplished by including an appropriate polar modifier such as an ether or a tertiary amine in the polymerization mixture.

Anionic initiators which may be utilized in the preparation of such diene polymers and copolymers may be any of the organoalkali metal initiators known in the art to be useful for the preparation of diene polymers and copolymers. The preferred initiators are organolithium initiators, especially the alkyllithium initiators. Suitable organolithium initiators which may be utilized include ethyllithium, n-butyllithium, tetramethylene dilithium, hexyllithium, cyclohexyl lithium, phenyllithium, tolyllithium and the like. A particularly preferred initiator is n-butyllithium.

Diene polymers or copolymers having a tin containing end group may also be utilized as the backbone of the graft copolymer. Such polymers or copolymers may be prepared by polymerizing the monomer or monomers in a hydrocarbon solvent in the presence of a tin containing initiator. Such an initiator is the reaction product of a triorgano substituted-tin halide or a hexaorgano substituted di-tin compound with lithium metal in the presence of a suitable solvent. Preferred is a triorgano substituted-tin halide having the general formula $R_3SnX$. The organic moiety R is selected form the group consisting of alkyls having from about 1 to about 20 carbon atoms, cycloalkyls having from about 3 to about 20 carbon atoms, aryls having from about 6 to about 20 carbon atoms and aralkyls having from about 7 to about 20 carbon atoms. Typical alkyls include n-butyl, s-butyl, methyl, ethyl, isopropyl and the like. The cycloalkyls include cyclohexyl, cycloheptyl and the like. The aryl and aralkyl groups include phenyl, benzyl and the like.

Such initiators may also be produced by other means. For example, the initiator may be formed as the reaction product of a hexaorgano-substituted di-tin compound $R_3SnSnR_3$ containing a tin-tin bond, with lithium metal (where R is as described hereinabove). Preferred di-tin compounds have between 6 and 12 carbon atoms, such as hexabutyldi-tin.

It is preferred that the initiators are the reaction product of from about 93 to about 99 percent by weight of an organotin compound and from about 1 to about 7 percent by weight of lithium.

The halide constituent X of the triorgano substituted-tin halide includes chlorides and bromides. Lithium is preferably present as a reactant in the form of lithium metal, and may also be present as a dispersion in mineral oil. Preferably, the solvent employed is tetrahydrofuran, tetramethylethylenediamine, or diethylene methyl ether (diglyme).

The desired reaction product of the triorgano substituted-tin halide and the lithium is a triorgano substituted-tin lithium compound. The preferred initiator has the general formula $R_3SnLi$, where R is as defined above. One preferred catalyst is the reaction product of tributyl tin chloride and lithium metal in tetrahydrofuran, forming tributyl tin lithium.

For a more detailed description of the procedure for preparing diene polymers or copolymers having tin containing and groups and the tin containing initiators utilized in such procedure, reference may be made to European patent application number 493,839 published Jul. 8, 1992, the disclosure of which is incorporated herein by reference.

Hydrocarbon solvents which may be employed in the preparation of the diene polymers and copolymers include aromatic and aliphatic hydrocarbons in which the monomers, initiator and modifier are soluble. Suitable hydrocarbon solvents include hexane, heptane, pentane, octane, cyclohexane, cycloheptane, cyclopentane, methyl cyclohexane, benzene and toluene. The preferred hydrocarbon solvents are hexane and toluene.

Polar modifiers which may be utilized to control the 1,2-microstructure content of the diene polymers or copolymers and to effect randomization of the copolymers may be any of those heretofore known in the diene polymer or copolymer art to be useful for that purpose. Suitable polar modifiers include ethers such as tetrahydrofuran (THF), tetrahydropyran, 1,4-dioxane, monoglycol methyl ether (monoglyme), diglycol methyl ether (diglyme), triglycol methyl ether (triglyme) and the oligomeric oxolanyl alkane compounds described in U.S. Pat. No. 4,429,091 such as bis (2-oxolanyl) methane; 2,2-bis (2-oxolanyl) propane; 1,1-bis (2-oxolanyl) ethane; 2,2-bis (5-methyl-2-oxolanyl) propane and the like and tertiary amine compounds such as triethyl amine, tripropyl amine, tributyl amine, N,N,N',N'-tetramethylethylene diamine (TMEDA) dipiperidino ethane, and the like. The preferred polar modifiers are TMEDA and the oligomeric oxolanyl propanes.

Diene polymers or copolymers employed as the backbone portion of the graft copolymer of the invention may have 1,2-microstructure contents ranging from about 10 to about 70 percent with the preferred polymers or copolymers having 1,2-microstructure contents of from 15 to 60 percent. The preparation of diene polymers or copolymers having a particular 1,2-microstructure content is dependent on a number of factors including the specific initiator, the type polar modifier, the modifier to initiator ratio and the polymerization temperature.

Illustrative methods of preparing diene polymers and copolymers having 1,2-microstructure contents ranging from 15 to 90 percent or more are described in numerous patents and publications including U.S. Pat. Nos. 3,451,988 and 4,264,753; and the publication "Temperature and Concentration Effects on Polar-Modifier Alkyllithium Polymerizations and Copolymerization", Journal of Polymer Science, Part A-1, Vol. 10, pages 1319–1334 (1972); the disclosures of which are incorporated herein by reference.

One of ordinary skill in the polymerization arts can, by utilizing the disclosures of the incorporated patents and publication, readily determine the type initiator, the type polar modifier, the necessary modifier-initiator ratio and polymerization conditions necessary to obtain a living diene polymer or copolymer having the desired 1,2-microstructure content.

An EPDM terpolymer rubber can also be utilized to form the backbone portion of the graft copolymer of the invention.

The term "EPDM" is used in the sense of its definition as found in ASTM-D-1418–64 and is intended to mean a terpolymer of ethylene, propylene and a diene monomer. Illustrative methods for preparing such terpolymers are found in U.S. Pat. No. 3,280,082 and British Pat. No. 1,030,289, the disclosures of which are incorporated herein by reference. The preferred terpolymers contain from about 40 to about 80 weight percent ethylene and from about 1 to about 10 weight percent of the diene with the balance of the terpolymer being propylene.

The diene monomer utilized in forming the EPDM terpolymer is preferably a non-conjugated diene. Illustrative examples of non-conjugated dienes which may be employed are dicyclopentadiene, alkyldicyclopentadiene, 1,4-pentadiene, 1,4-hexadiene, 1,5-hexadiene, 1,4-heptadiene, 2-methyl-1,5-hexadiene, cyclooctadiene, 1,4-octadiene, 1,7-octadiene, 5-ethylidene- 2-norbornene, 5-n-propylidene-2-norbornene, 5-(2-methyl-2-butenyl)-2-norbornene and the like. A typical EPDM is Vistalon 2504 (Exxon chemical Co.), a terpolymer having a Mooney Viscosity (ML, 1+8, 100° C.) of about 40 and having 50 weight percent of ethylene, 45 weight percent of propylene and 5.0 weight percent of 5-ethylidene-2-norbornene with an $M_n$ as measured by GPC of about 47,000 and an $M_w$ as measure by GPC of about 174,000.

A preferred EPDM is Royalene® 521 (Uniroyal Chemical Co.), a terpolymer having a Mooney Viscosity (ML/4/100° C.) of about 50 and having 50 weight percent of ethylene, 43 weight percent of propylene and 6.6 weight percent of ethylidene norbornene.

As indicated, a polymerized metal salt of an unsaturated carboxylic acid is pendently grafted to the unsaturated hydrocarbon rubber backbone of the graft copolymer. Unsaturated carboxylic acids which maybe used to form the metal salt are alpha, beta-ethylenically unsaturated carboxylic acids having from 3 to 8 carbon atoms such as acrylic, methacrylic, cinnamic and crotonic acids of which acrylic and methacrylic acids are preferred. Suitable metal ions which may be used to form the metal salts include sodium, potassium, magnesium, calcium, zinc, barium, aluminum, tin, zirconium, lithium and cadmium of which zinc and magnesium are preferred. The metal ion is preferably introduced in the form of the salt of the carboxylic acid. A preferred metal salt is zinc dimethacrylate.

The graft copolymer can be prepared by a relatively uncomplicated procedure. Thus, the graft copolymer can be prepared by first dissolving an unsaturated hydrocarbon rubber of the type described above such as polybutadiene in a solvent such as hexane, then adding a metal salt of an unsaturated carboxylic acid such as zinc dimethacrylate to the polymer solution, adding a free radical initiator such as azo-bis-isobutyronitrile to the polymer solution and then heating the reaction mixture at a temperature of from about 40 to about 150° C. for a time period of from about 0.1 to about 100 hours to form the graft copolymer.

The unsaturated hydrocarbon rubber may be dissolved in any solvent in which both the rubber or rubbery polymer and the free radical initiator are soluble. However, the preferred solvents are the hydrocarbon solvents in which the original polymers were prepared. Thus, the preferred solvents are the hydrocarbon solvents described above and of these hexane and toluene are particularly preferred.

The metal salt (e.g. zinc dimethacrylate) is preferably added to the resultant polymer solution contained in a suitable reactor in the form of a fine powder with stirring and under a nitrogen atmosphere to form a dispersion of the metal salt in the polymer solution. While not essential, it is often desirable and preferred to add a surfactant along with the metal salt to the polymer solution in order to provide for a more stable dispersion of the metal salt in the polymer solution. The preferred surfactants for that purpose are nonionic octylphenoxy polyethoxy ethanol surfactants available from Rohm and Haas Company under the designations Triton X-15, Triton X-45 and Triton X-100.

As indicated, a free radical initiator is then added to the polymer solution containing the metal salt to effect graft polymerization of the metal salt to the polymer backbone. It is generally preferred to seal the reactor containing the polymer solution and dispersed metal salt prior to adding the initiator and then to add the initiator in liquid form under pressure to the reactor. Suitable free radical initiators which may be added to the polymer solution for that purpose include di-sec-butyl peroxydicarbonate, t-amyl peroxy pivalate, 2,5-dimethyl-2,5-di-(2-ethylhexanoyl-peroxy) hexane, t-amylperoxy-2-ethylhexanoate, t-butyl-2-ethylhexanoate, 2,2-azo-bis-(2-methyl propionitrile) and the like.

After addition of the free radical initiator is completed, the reaction mixture is heated at a temperature of from about 40 to about 150° C. for a time period of from about 0.1 to about 100 hours to produce the graft copolymer.

The graft copolymers can be recovered from the reaction medium by various conventional methods such as alcohol coagulation, steam desolventization, thermal desolventization and the like. Additionally, solvent may be removed from the graft copolymer by drum drying, extruder drying, vacuum drying and the like.

As indicated, the graft copolymers of the invention comprise an unsaturated hydrocarbon rubber or polymer backbone having pendently grafted thereto a polymerized metal salt of an unsaturated carboxylic acid. The graft copolymers herein may contain from about 98 to about 45 percent by weight of the unsaturated hydrocarbon rubber and from about 2 to about 55 percent by weight of the polymerized metal salt.

The graft copolymers of the invention are sulfur curable and when cured exhibit high modulus properties at low strain (i.e. 50%) measurements. The graft copolymers may be compounded with conventional rubber additives such as carbon black, fillers, processing oils, accelerators and the like. In addition, the graft copolymers may be blended with various other rubbers such as natural rubber, polybutadiene, polyisoprene, EPDM and the like to form rubber compounds having utility in tires, industrial rubber goods, molded rubber goods and the like.

The following examples are submitted for the purpose of further illustrating the nature of the present invention and are not to be regarded as a limitation on the scope thereof. Parts and percentages shown in the examples are by weight unless otherwise indicated.

EXAMPLE 1

Into a 28 ounce bottle was charged 30.0 grams of a conventional polybutadiene rubber having a Mooney Viscosity (ML/4/100° C.) of 55 and a vinyl content of 12 percent along with 500 cc of tetrahydrofuran (THF). After the rubber had dissolved, 30.0 grams of zinc dimethacrylate prepared substantially in accordance with the method set forth in U.S. Pat. No. 4,500,466 was added to the bottle. Then, 2.0 grams of azobis-isobutyronitrile initiator (AIBN) was added to the bottle. The bottle was sealed and then heated at 50° C. for 1 hour and at 70° C. for 24 hours. The resultant graft copolymer was recovered from the reaction medium by evaporation of the solvent.

EXAMPLES 2–6

These examples illustrate the preparation of graft copolymers in which the backbone polymer was an ethylene/propylene/diene monomer terpolymer (EPDM).

In these examples, the graft copolymers were prepared in 28 ounce bottles substantially in accordance with the procedure of Example 1. Thus, to each of 5 bottles were charged 60 grams of Royalene 521 EPDM, 30 grams of zinc dimethacrylate and 500 cc of hexane. The types and amounts of initiator were varied along with the graft polymerization conditions. The resultant graft copolymers were tested for Mooney Viscosity (ML/4/100° C.) and analyzed for percent graft. The types and amounts of initiators, graft polymerization conditions, Mooney Viscosity and percent graft are shown in Table II.

TABLE II

| | Initiator | | Polymerization | | |
|---|---|---|---|---|---|
| Ex. No. | Type | Amount g phr$_{(1)}$ | Temp, °C. | Time/hrs. | ML/4/100° | % graft$_{(2)}$ |
| 2 | A | 0.77 | 70 | 22 | 102.7 | 78.2 |
| 3 | B | 2.48 | 80 | 22 | 165 | 60.7 |
| 4 | C | 1.23 | 70 | 22 | 128.5 | 87.2 |
| 5 | C | 2.11 | 70 | 22 | 130 | 74.4 |
| 6 | D | 0.12 | 50 | 22 | 162.7 | 80.8 |

A = azobis isobutyronitrile (AIBN)
B = T-butyl peroxy-2-ethylhexanoate
C = 2,5-dimethyl-2,5-di-(2-ethylhexanoyl-peroxy)hexane
D = di-sec-butyl peroxydicarbonate
(1) g phr = grams per 100 parts of rubber
(2) the % graft was determined by using the following procedure:

The zinc was removed by stirring 2.000 g ($W_o$) of copolymer in a solution of 5 cc concentrated HCl diluted with 50 cc of water and then mixed with 40 cc of THF. At least 2 hours was required if the copolymer was in the form of a thin porous roll from the drum dryer. When a more compacted sample was obtained the same time could be used if it was first cut into small pieces (6 mm max. thickness) before extraction. If this was not possible, extraction times were extended to 6 hours. No additional extractables were removed by continuing the time up to 70 hours.

The rubber was isolated by filtration and washing three times with 100 cc of water. The sample was vacuum dried from 60° C. to 100° C. to give the rubber that was grafted with polymethacrylic acid ($W_d$). The % graft was calculated by the following equation.

$$\% \text{ Graft} = \frac{\left(\left(\frac{W_d}{W_o} - f_r\right)(100)\right)}{0.731(l - f_r)}$$

Where $f_r$ is the weight fraction of rubber present in the graft copolymer and 0.731 is the calculated maximum weight of polymethacrylic acid that would be present in the zinc methacrylate, after the acid extraction of the zinc.

EXAMPLES 7–10

These examples further illustrate the preparation of graft copolymers of the invention using different backbone polymers.

The graft copolymers were prepared using the following general procedure:

To a 2 gallon reactor equipped with stirrer, thermometer and nitrogen inlet were charged 644 grams of polymer and 6.48 pounds of hexane. After the rubber had dissolved, 1.25 milliliters each of Triton X-15, Triton X-45 and Triton X-100 surfactants and 322 grams of zinc dimethacrylate powder were added to the reactor. The reactor was then sealed and purged with nitrogen to remove all oxygen. The resultant reaction mixture was then stirred to disperse the zinc dimethacrylate powder evenly throughout the solution. The reactor was then heated to the temperature desired for the free radical peroxide initiator being used. The liquid peroxides were diluted in hexane and then pressured into the reactor while the solid initiators were dissolved to provide a 4% solution in toluene before being added to the reactor. The solvent was removed from the resultant graft copolymer by drum drying and the copolymer was mixed with an antioxidant.

The resultant graft copolymer was tested for Mooney Viscosity (ML/4/100° C.) and analyzed for percent graft. The type polymers, type and amount of initiator, graft polymerization conditions, Mooney Viscosity and percent graft are shown in Table III.

TABLE III

| Ex. No. | Polymer | Initiator Type | Amt. g phr | Polymerization Temp. °C. | Time/ Hrs. | ML/4/ 100° C. | % graft |
|---|---|---|---|---|---|---|---|
| 7 | Polybutadiene[1] | A | 1.01 | 75 | 18 | 120.9 | 96.2 |
| 8 | Di Tin SBR[2] | A | 0.54 | 75 | 18 | 76.8 | 90.6 |
| 9 | Polyisoprene[3] | A | 0.54 | 75 | 18 | 124.6 | 91 |
| 10 | SBR[4] | D | 0.08 | 70–108 | 1.75 | 91.4 | 75.6 |

(1) polybutadiene of Example 1.
(2) styrene/butadiene copolymer having tin end groups containing 35 percent styrene and having a Mooney Viscosity of 58 and a vinyl content of 18%.
(3) a high cis polyisoprene having a Mooney Viscosity of 45.
(4) styrene/butadiene copolymer containing 23.5 percent styrene and having a Mooney Viscosity of 55 and a vinyl content of 10%.

The following examples are submitted for the purpose of illustrating the effect of grafted zinc dimethacrylate on the physical properties of the graft copolymer.

EXAMPLES 11–13

In these examples, graft copolymers were prepared by grafting various levels of zinc dimethacrylate, hereinafter abbreviated as $Zn(MA)_2$, on the base (i.e. ungrafted) SBR of Example 10.

The graft copolymers were prepared substantially in accordance with the procedure used in preparing the graft copolymers of Examples 7–10. The percent poly $Zn(Ma)_2$ in the graft copolymer and percent graft are shown in Table IV.

TABLE IV

| Ex. No. | 11 | 12 | 13 |
|---|---|---|---|
| Rubber | $Zn(MA)_2$SBR* | $Zn(MA)_2$SBR | $Zn(MA)_2$SBR |
| % Poly $Zn(MA)_2$ | 16.7 | 33.8 | 42.0 |
| % graft | 6.0 | 26.3 | 18.3 |

*$Zn(MA)_2$ grafted SBR

The above graft copolymers were compounded with sulfur and accelerator. For comparative purposes, the base SBR of Example 10 was compounded with zinc oxide, stearic acid, sulfur and accelerator to serve as a control.

The rubber compounds had the following formulations:

| | Parts by weight | | | |
|---|---|---|---|---|
| Compound Ex. | Control | 11 | 12 | 13 |
| Ingredients | | | | |
| Base SBR of Ex. 10 | 100.00 | — | — | — |
| $Zn(MA)_2$ SBR of Ex. 11 | — | 100.00 | — | — |
| $Zn(MA)_2$ SBR of Ex. 12 | — | — | 100.00 | — |
| $Zn(MA)_2$ SBR of Ex. 13 | — | — | — | 100.00 |
| Zinc Oxide | 5.00 | — | — | — |
| Stearic Acid | 2.00 | — | — | — |
| Sulfur | 1.80 | 1.80 | 1.80 | 1.80 |
| Accelerator | 1.00 | 1.00 | 1.00 | 1.00 |
| Total | 109.80 | 102.80 | 102.80 | 102.80 |

The above compounds were mixed, cured and tested for stress-strain properties at room temperature. Tests and test results are shown in Table V.

TABLE V

| Compound Ex. | Control | 11 | 12 | 13 |
|---|---|---|---|---|
| Stress-Strain at R.T. Cure: 40 min. at 150° | | | | |
| 50% modulus, psi | 111 | 119 | 194 | 418 |
| 100% modulus, psi | 104 | 164 | 258 | 538 |
| 200% modulus, psi | — | 222 | 376 | 722 |
| 300% modulus, psi | — | — | 497 | 898 |
| Tensile, psi | 204 | 273 | 743 | 1186 |
| Elongation at Break, % | 144 | 292 | 498 | 426 |

As will be evident from the above data, the graft copolymers of the invention exhibit high modulus in the cured state.

We claim:

1. an uncured, sulfur curable graft copolymer comprising an unsaturated hydrocarbon rubber backbone, said rubber having a degree of unsaturation of at least one percent by weight and having pendently grafted thereto a polymerized metal salt of an unsaturated carboxylic acid.

2. The graft copolymer of claim 1 wherein said unsaturated hydrocarbon rubber is selected from the group consisting of diene polymers or copolymers and ethylene/propylene/diene monomer terpolymers.

3. The graft copolymer of claim 2 wherein said diene polymers or copolymers have tin end groups.

4. The graft copolymer of claim 2 wherein said diene polymers or copolymers are selected from the group consisting of polybutadiene, polyisoprene and styrene/butadiene copolymers.

5. The graft copolymer of claim 1 wherein said metal salt is a metal salt of an alpha, beta-ethylenically unsaturated carboxylic acid.

6. The graft copolymer of claim 1 wherein said metal salt is zinc dimethacrylate.

7. The graft copolymer of claim 1 wherein said graft copolymer contains from about 98 to about 45 percent by weight of the unsaturated hydrocarbon rubber and from about 2 to about 55 percent by weight of the polymerized metal salt of the unsaturated carboxylic acid.

8. A method for preparing an uncured, sulfur curable graft copolymer comprising an unsaturated hydrocarbon rubber backbone having pendently grafted thereto a polymerized metal salt of an unsaturated carboxylic acid, said method comprising the steps of:

(1) dissolving an unsaturated hydrocarbon rubber in a solvent to form a rubber solution;

(2) adding a metal salt of an unsaturated carboxylic acid to the solution;

(3) adding a free radical initiator to the solution to form a reaction mixture;

(4) heating the resulting reaction mixture at a temperature of from about 40 to about 150° C. for a time period of from about 0.1 to about 100 hours; and (5) recovering the resultant graft copolymer from the solution.

9. The method of claim 8 further comprising adding a surfactant to the rubber solution prior to step (2).

10. The method of claim 8 wherein said unsaturated hydrocarbon rubber is selected from the group consisting of diene polymers or copolymers and ethylene/propylene/diene monomer terpolymers.

11. The method of claim 10 wherein said diene polymers or copolymers have tin end groups.

12. The method of claim 10 wherein said diene polymers or copolymers are selected from the group consisting of polybutadiene, polyisoprene and styrene/butadiene copolymers.

13. The method of claim 8 wherein said metal salt is a metal salt of an alpha, beta-ethylenically unsaturated carboxylic acid.

14. The method of claim 8 wherein said metal salt is zinc dimethacrylate.

15. The method of claim 8 wherein said free radical initiator is a peroxide initiator.

16. The method of claim 15 wherein said peroxide initiator is azo-bis-isobutyronitrile.

\* \* \* \* \*